April 12, 1966 W. E. A. SCHMIDT 3,245,193
METHODS OF AND APPARATUS FOR PACKAGING ELECTRICAL COMPONENTS
Filed June 19, 1962 9 Sheets-Sheet 1

INVENTOR
W.E.A. SCHMIDT
BY *S. Gundersen*

INVENTOR.
W. E. A. SCHMIDT
BY *S. Gundersen*

April 12, 1966  W. E. A. SCHMIDT  3,245,193
METHODS OF AND APPARATUS FOR PACKAGING ELECTRICAL COMPONENTS
Filed June 19, 1962  9 Sheets-Sheet 6

INVENTOR.
W.E.A. SCHMIDT
BY *S. Gundersen*

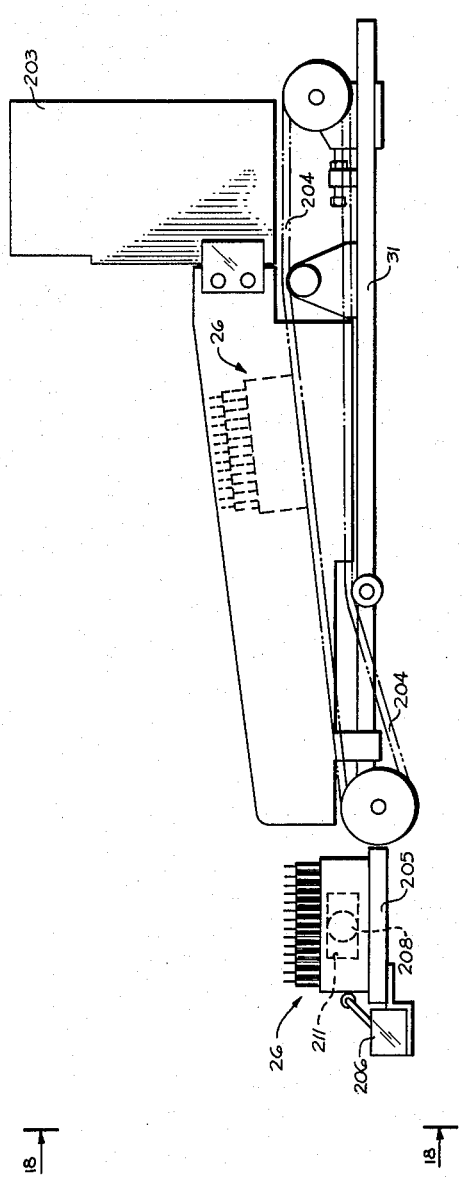
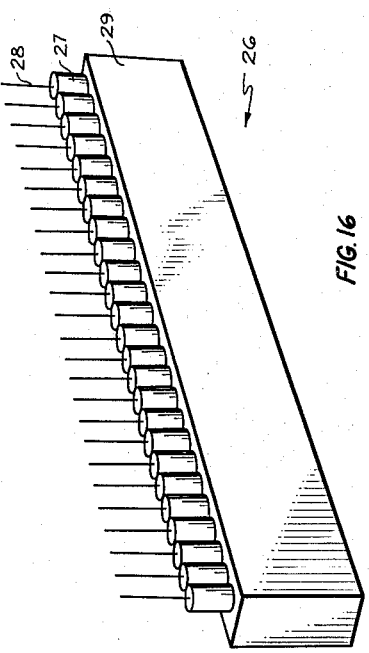

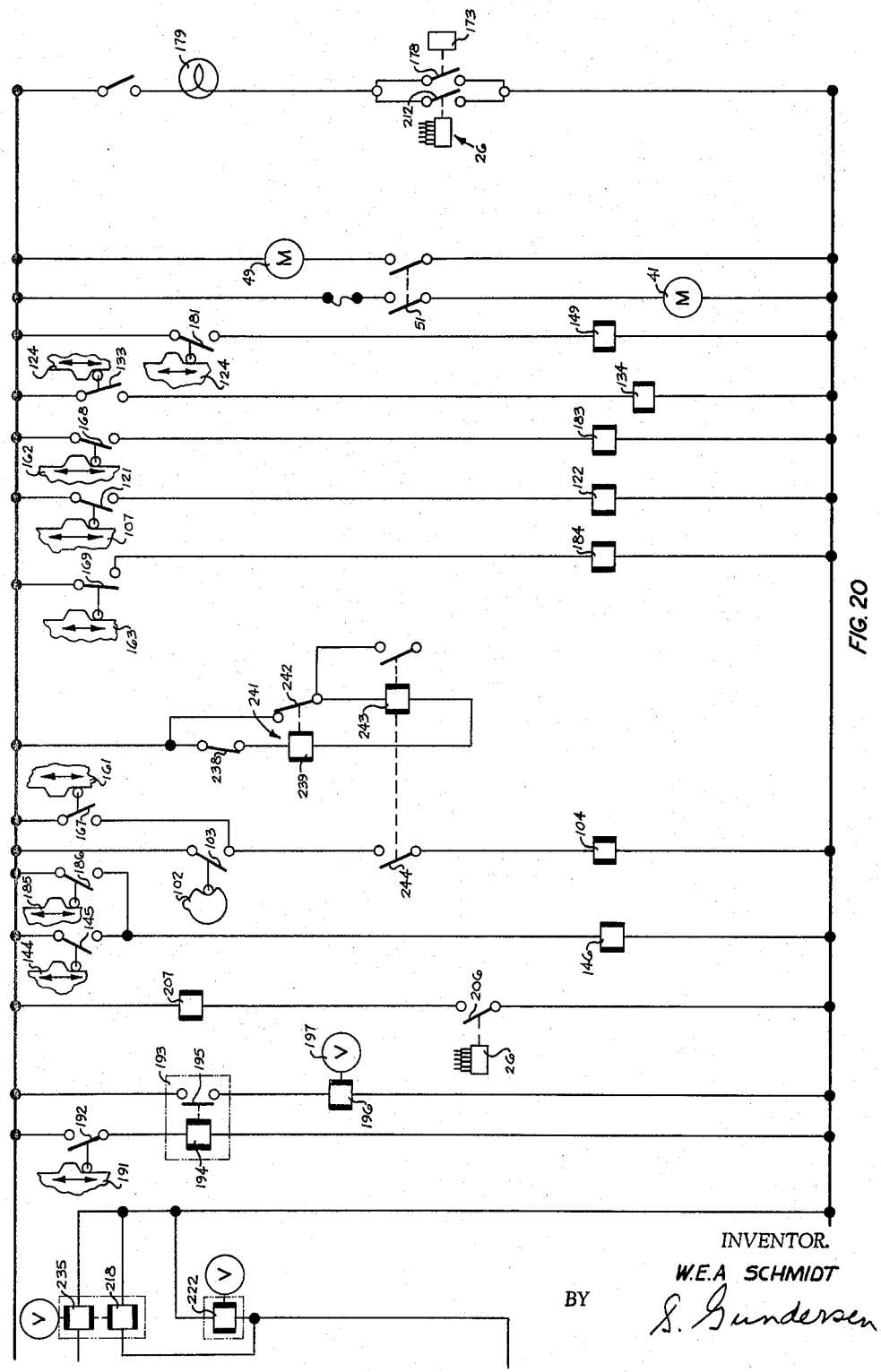

United States Patent Office 3,245,193
Patented Apr. 12, 1966

3,245,193
METHODS OF AND APPARATUS FOR PACKAGING ELECTRICAL COMPONENTS
Wilhelm E. A. Schmidt, Winston-Salem, N.C., assignor to Western Electric Company, Incorporated, New York, N.Y., a corporation of New York
Filed June 19, 1962, Ser. No. 203,615
9 Claims. (Cl. 53—3)

This invention relates to methods of and apparatus for packaging electrical components, and more particularly to methods of and apparatus for straightening leads extending from electrical components and packaging the components by inserting the straightened leads in a penetrable block.

In the handling of miniature or other electrical components, such as resistors, rolled capacitors, etc., with coaxially-extending leads, there is a need for a method and apparatus for packaging and storing the components. One expedient contemplates storing the components in a penetrable block. This may be accomplished by straightening the extended leads and then inserting the leads in a block of penetrable material. The leads must not only be straightened, but also guided during the insertion in a block so that uniform packaging may be achieved. Components, so packaged, may be utilized in subsequent fabricating machines, or the components may be readily removed and tested by automatic equipment.

Therefore, it is an object of the invention to provide new and improved methods and apparatus for packaging electrical components.

A further object resides in new and improved methods and apparatus for automatically straightening a plurality of leads of electrical components and packaging the components as a single unit.

Another object of the invention is the provision of methods and apparatus for assembling in a predetermined arrangement a plurality of components having coaxial leads extending therefrom, wherein the leads may be subsequently straightened.

An additional object of the invention resides in methods and apparatus for positioning a straightening device substantially about a plurality of leads extending from assembled components.

A still further object of the invention is the presentation of a unique arrangement of mechanisms that function to sequentially enclose the extended leads of components and move about the enclosed leads so that the leads are straightened thereby.

An additional object of the invention is to provide a method and apparatus for straightening the component leads and then utilizing the straightening facilities to support the leads during insertion in a penetrable block.

With these and other objects in view, the present invention contemplates a method and apparatus for automatically assembling a plurality of electrical components in a juxtaposed group wherein the components are provided with leads extending therefrom. A lead-straightening device engages the extended leads of the components and is moved along the leads so that the leads are straightened thereby. Upon completion of the lead-straightening operation, the assembled components are moved relatively with respect to a block of penetrable material so that the straightened leads are substantially embedded in the block to form a unit therewith while the straightening device guides and supports leads.

Other objects and advantages of the present invention will be apparent from the following detailed description, when considered in conjunction with the accompanying drawing, wherein:

FIG. 6 is an enlarged sectional view taken along line 6—6 of FIG. 1 showing a safety feature associated with the lead-straightening devices;

FIG. 16 is a perspective view of the completed product assembled by the apparatus depicted in other views showing the electrical components having extended leads embedded in the penetrable block;

FIG. 17 is a rear elevational view of a package conveying mechanism partially shown on the right side of FIG. 1;

FIG. 18 is a sectional view taken on lines 18—18 of FIG. 17 showing the package conveying means for arranging the completed product in an assembled group, and FIGS. 19 and 20 show a control circuit for the apparatus.

*General description*

Referring first to FIG. 16, there is shown a packaged unit 26 consisting of a plurality of resistors 27 having corresponding axially extended leads 28 which have been inserted into a block 29 composed of penetrable material, such as Styrofoam.

Figure 1:
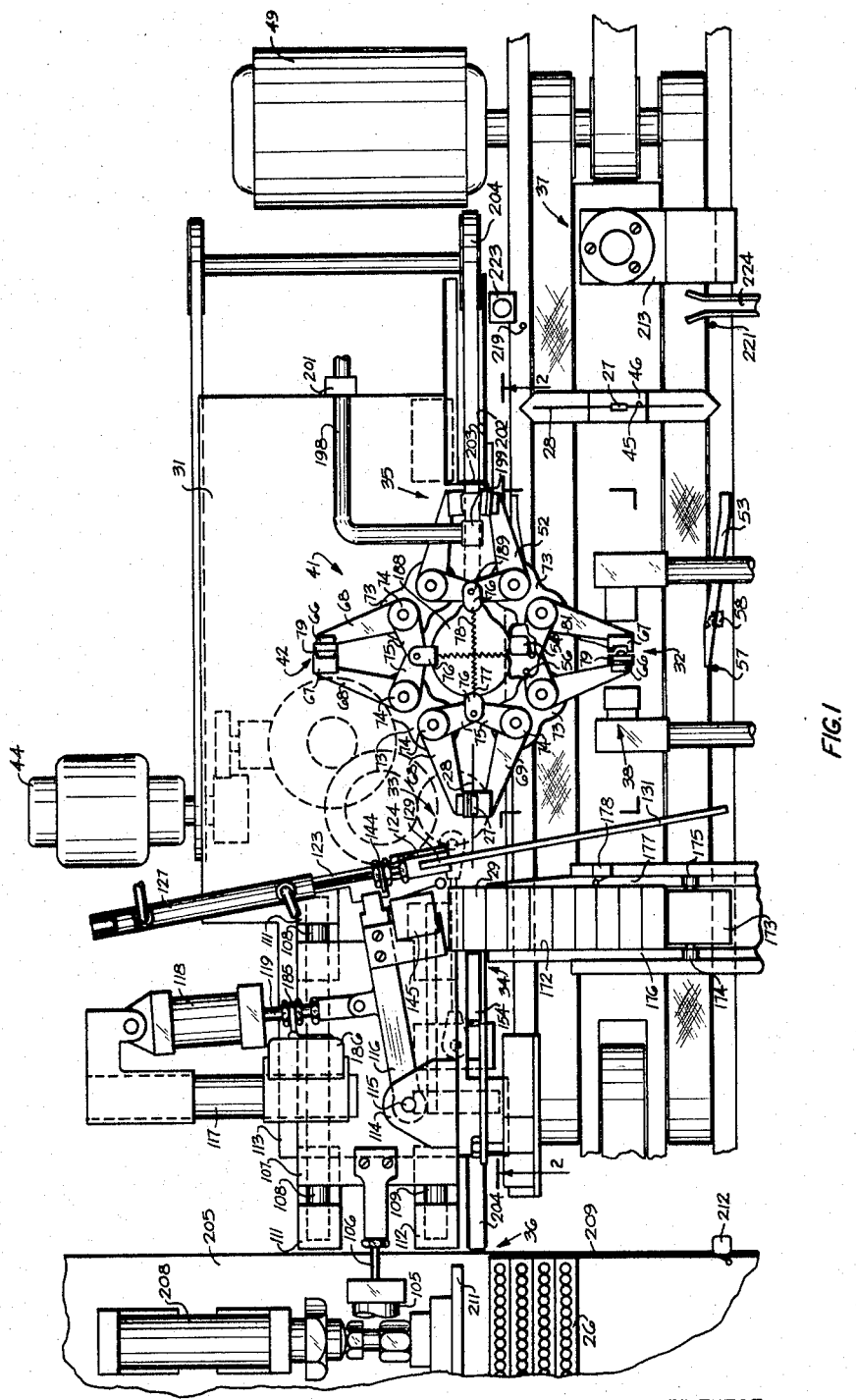
FIG. 1 is a plan view of an apparatus for sequentially assembling a plurality of electrical components, straightening leads extending from the components, and packaging the components in accordance with the principles of the invention.

The machine, as shown in the top view, FIG. 1, is supported by a frame 31 and includes a loading station, generally designated by the reference numeral 32, wherein the resistors 27 are conveyed singly to the loading station 32 and transferred to a turret 41 in a vertical array with the leads 28 extending horizontally therefrom in a common plane. The turret 41 transfers the array of resistors 27 to a lead-straightening station 33, whereat inserting facilities 34 cooperate to insert the resistor leads 28 into a Styrofoam block 29 to complete the packaged unit 26. An unloading station, generally designated by the reference numeral 35, includes facilities that release and feed the packaged unit 26 to a tray loading station 36, wherein a plurality of the packaged units 26 are positioned for manual unloading. In addition, a sensing station, generally designated by the reference numeral 37, is positioned in the feed path of the resistors 27 to detect the presence of a special magnetic article to indicate the terminations or completion of the feeding of a predetermined batch of the resistors 27.

Figure 2:
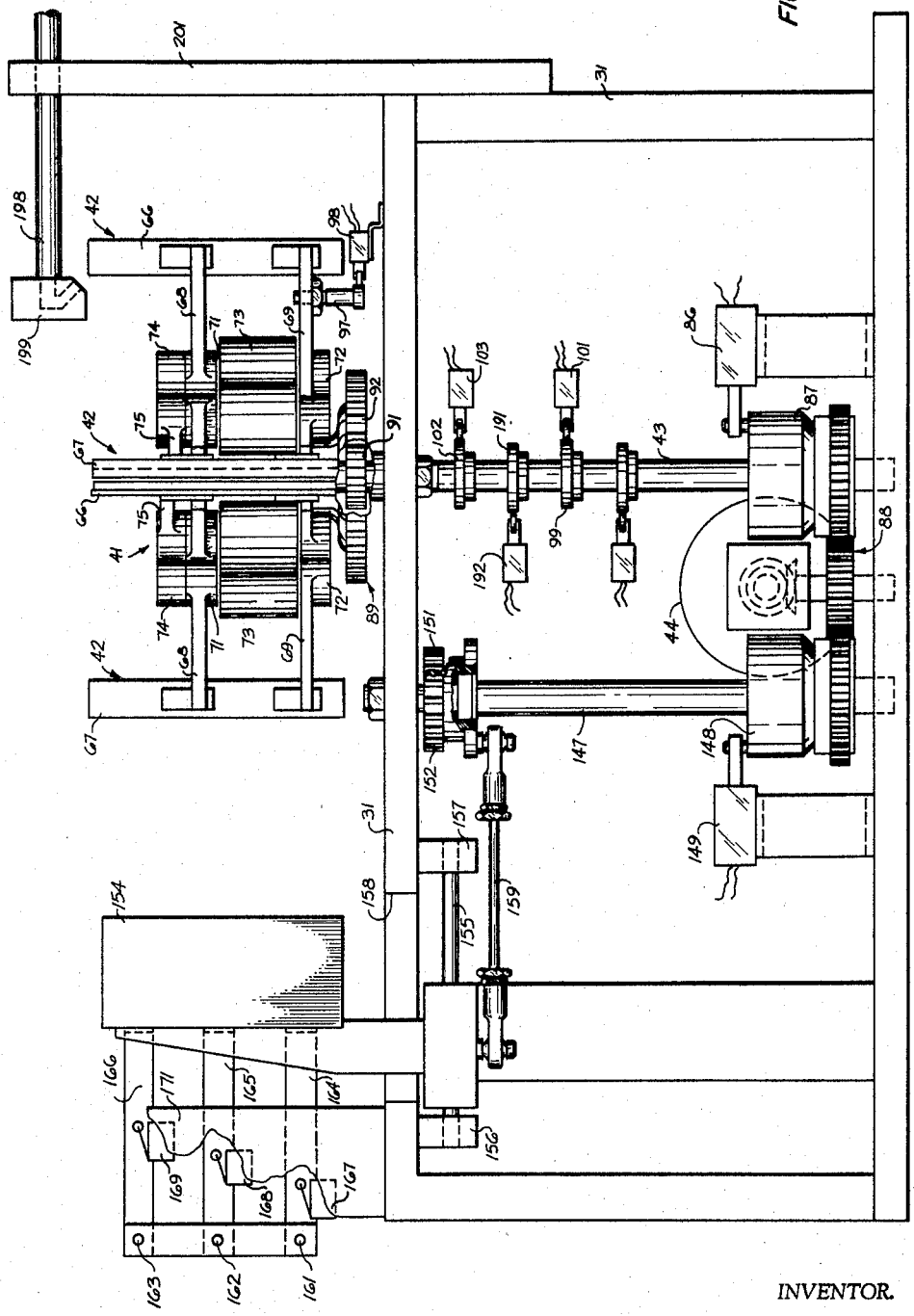
FIG. 2 is a front elevational view, partially cut away, taken along line 2—2 of FIG. 1 showing a turret transfer mechanism for receiving the components and a pusher mechanism for inserting a block of penetrable material onto the straightened extended leads.
Figure 19:
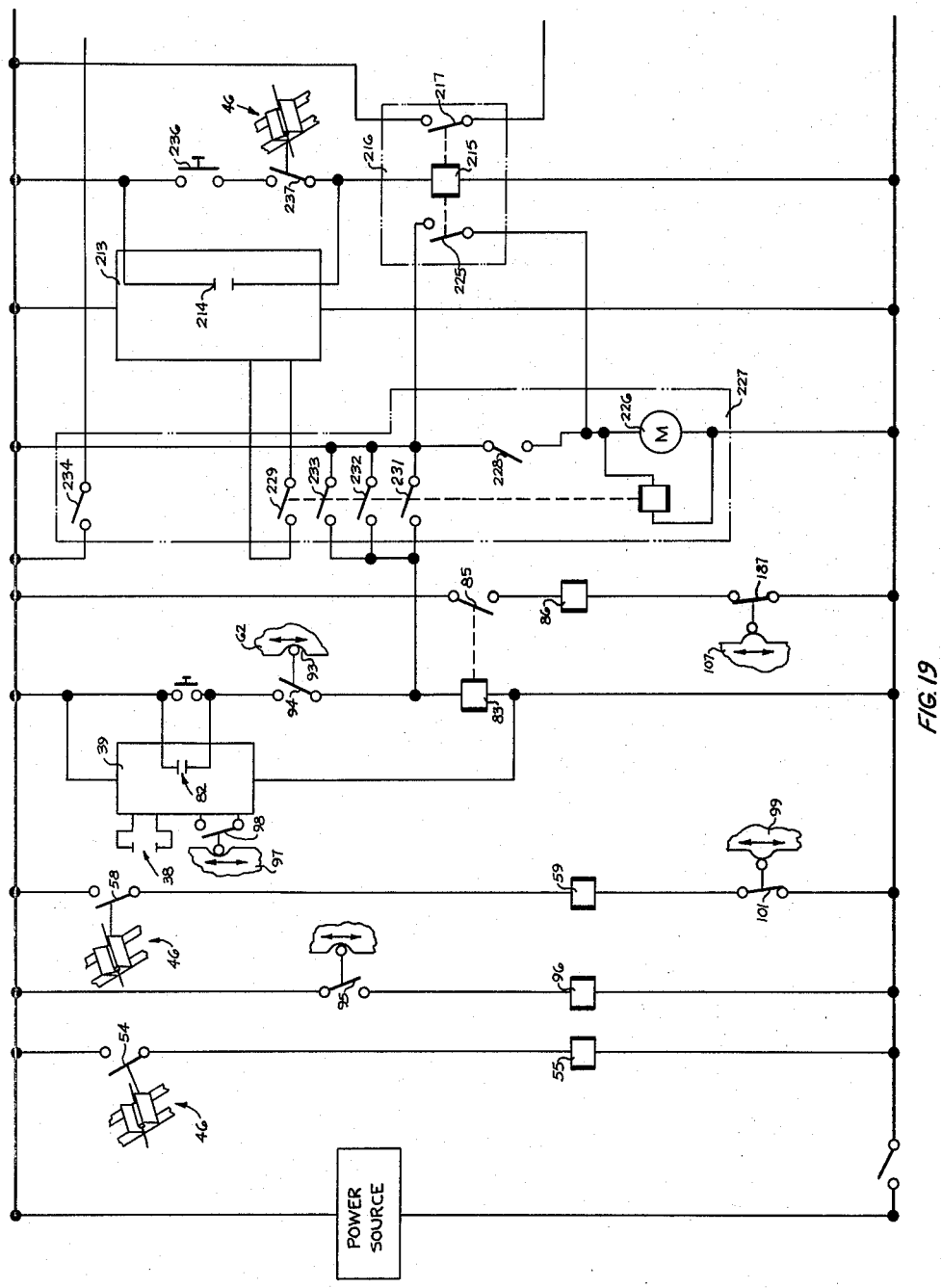

A photoelectrically controlled device, generally designated by the reference numeral 38, senses the loading of the resistors 27 at the loading station 32 and further controls a counter 39 (FIG. 19). The counter 39 controls the rotational movement of the turret 41, where, upon the loading of a given number of resistors 27 onto the turret 41, the counter 39 functions to rotate the turret 41, thereby positioning the loaded resistors 27 in a proper orientation with respect to lead-straightening station 33 and Styrofoam inserting station 34 for completion of the packaging operation. To facilitate the transfer of the loaded resistors 27 and the packaged unit 26, the turret 41, as shown in FIGS. 1 and 2, is provided with four sets of equally spaced, spring-biased gripping members 42. The turret 41 is gear-connected to a shaft 43 and driven by a drive motor 44.

Component loading

Figure 3:
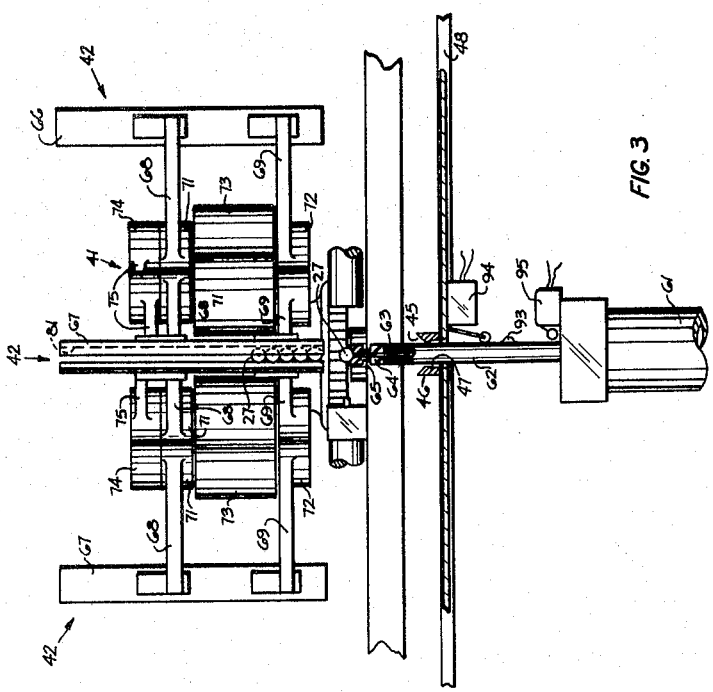
FIG. 3 is a partial front elevational view showing a lifting device for inserting the component into the transfer turret.

Referring now to FIGS. 1 and 3, each resistor 27 is positioned within a V-groove 45 of a pallet 46 having an aperture 47 (FIG. 3) extending from the underside into the apex of the groove 45. The pallet 46 is positioned on a dual belt conveyor 48, which is driven by a motor 49. Upon the closing of a double pole switch 51 (FIG. 20), the motors 44 and 49 are operated whereupon the pallets 46 and resistors 27 are conveyed towards the loading station 32. A pair of spring-biased fingers 52 and 53 center the resistor 27 on the pallet 46 to ensure proper positioning of the resistor relative to the loading station 32. Upon further advancement of the pallet 46, a switch 54 (FIG. 19) is actuated whereupon a solenoid 55 (FIG. 19) is operated to pneumatically advance a pair of stop pins 56 and 57 into the path of the pallet 46, thereby stopping the pallet. In addition, a switch 58 (FIG. 19) is also actuated by the movement of the pallet 46 into the loading station 32 to operate a solenoid 59, thereby actuating an air cylinder 61 to pneumatically advance a vacuum-lift rod 62 (FIG. 3) through the aperture 47 of the pallet 46 to lift the resistor 27 from the pallet. It is to be noted that the conveyor 48 consists of a pair of spaced bands which permits vacuum-lift rod 62 to pass between the bands and through the aperture 47 of the pallet 46 and into engagement with the resistor 27.

As shown in FIG. 3, the vacuum-lift rod 62 is formed with a central bore 63 extending through the entire length of the rod 62 which is connected to a vacuum supply (not shown) to provide the vacuum needed to grip the resistor 27. Additionally, a tip 64 of the rod 62 is formed of shearable material such as Teflon. An annular groove 65 is formed in the periphery of rod 62 to facilitate the shearing of the tip 64 in the event the turret 41 is indexed prematurely.

The resistor 27 is lifted by the rod 62 and inserted between a pair of gripping pads 66 and 67 which are mounted for rotation on the turret 41. As viewed in in FIGS. 1, 2 and 3, each pair of the gripping pads 66 and 67 is mounted on a pair of support arms 68 and 69 having hubs 71 and 72, respectively. The pairs of hubs 71 and 72 are mounted for rotation on a plurality of supports 73 which form a portion of the turret 41. As shown in FIGS. 2 and 3, coaxially positioned above and fixedly mounted to the pairs of hubs 71 and 72 are a plurality of hubs 74, each of which are provided with a radiating arm 75. The ends of the arms 75, which are associated with each of the pairs of gripping arms 66 and 67, are pivotally connected together. A spring anchor link 76 is pivotally mounted on the connected ends of the arms 75. A pair of springs 77 and 78 are connected between opposing spring-anchor links 76 (see FIG. 1), thereby resiliently retaining the gripping members 66 and 67 in a closed position in anticipation of the insertion of the resistors 27 therebetween. The gripping arm 66 is provided with a plastic ribbon 79 secured to the surface which opposes the gripping arm 67. The gripping arm 67 is formed with a slot 81 in the surface which opposes the plastic ribbon 79 of the gripping arm 66.

Each lifted resistor 27 is inserted between the ribbon 79 and the slot 81 of the gripping arms 66 and 67, respectively. The vertical lift rod 62 will insert each resistor 27 into the lower extremity of the gripping arms 66 and 67. Each succeeding resistor 27, when loaded, will thereby force the previously loaded resistors into a higher position between the arms 66 and 67.

As previously indicated, the photocell system 38 is positioned to facilitate the sensing of each resistor 27 as it is inserted between the gripping arms 66 and 67, thereby controlling the counter 39 to register the number of resistors loaded. Upon the insertion of a given number of resistors 27 between the gripping arms 66 and 67, the counter 39, as viewed in FIG. 19, closes a contact 82 to provide energy for a coil 83 of a relay 84. Upon the energization of the coil 83, a contact 85 of the relay 84 is closed, thereby providing energy for a solenoid 86 (FIG. 2).

As shown in FIG. 2, the solenoid 86 controls a single-revolution clutch 87 which is connected to the shaft 43 so that the shaft 43 is driven by the motor 44 through a gear system 88 and the clutch 87. Additionally, the shaft 43 is connected to a reduction gear system, generally designated by the numeral 89, consisting of gears 91 and 92 which drive the turret 41. Upon actuation of the solenoid 86, the one-revolution clutch 87 is released to allow one revolution of the shaft 43, and hence the gear 91. Due to the reduction arrangement between gear 91 and gear 92, the turret 41 is thereby rotated one quarter of a revolution. It is to be noted, however, that the energy is not supplied to the relay 84 (see FIG. 19) until the vertical lift rod 62 has traveled a predetermined distance such as ¼ inch on the down stroke, whereupon a cam 93 formed on the rod 62 actuates a switch 94 to permit energization of the relay 84 (FIG. 19). Therefore, the turret 41 is prevented from rotating during the period of time when the vertical lift rod 62 is in partial engagement with the lower extremities of the gripping arms 66 and 67. Further, the cam 93 energizes a switch 95 (FIG. 19) to operate a solenoid 96 to lower the pin stops 56 and 57 to permit the empty pallet 46 to move from the loading station 37 on the conveyor 48.

Additionally, a cam 97 positioned on the turret 41 actuates a switch 98 (FIG. 19) upon the rotation of the turret 41 to reset the counter 39, thereby opening the contact 82 and removing the energy from the relay 84 and hence the solenoid 86. In this manner, the apparatus is conditioned for another loading cycle. To prevent the untimely upward movement of the lift rod 62 during the rotation of the turret 41, a cam 99 positioned on the shaft 43 opens a normally closed switch 101 thereby preventing the energization of the solenoid 59 and hence the raising of the lift rod 62.

Lead straightening

As previously discussed, the turret 41 is rotated 90 degrees to position the previously vertically arrayed and gripped resistors 27 at the lead straightening station 33. As the turret 41 is rotated, a cam 102 (FIG. 2) mounted on the shaft 43 actuates a switch 103 to apply energy to a solenoid 104 (see FIG. 20) to operate an air valve (not shown) connected in a line leading to an air cylinder 105 (see FIGS. 1 and 5). As viewed in FIGS. 1, 4 and 5, the operation of the air valve and application of air to cylinder 105 advances a piston rod 106. Extending from and fixedly connected to the piston rod 106 is a carriage 107 mounted to slide on a pair of rods 108 and 109 which are mounted in U-shaped blocks 111 and 112, respectively, on a support 113. Hence, as the air cylinder 105 is actuated, the carriage 107 is slidably moved along the rods 108 and 109. A support 114 is positioned on the carriage 107 to vertically support a shaft 115 which pivotally supports an arm 116. Pivotally mounted on an extension 117 of the carriage 107 is an air cylinder 118 which is provided with a piston rod 119 pivotally connected to the arm 116. As the carriage 107 moves forward, due to the operation of the air cylinder 105, a switch 121 (FIG. 20) is closed to energize a solenoid 122 to actuate an air valve (not shown), to supply air to the air cylinder 118 which moves the piston rod 119 to pivot the arm 116. Fixedly mounted on the end of the arm 116 is a crossbar 123 which forms a fixed support for a comb 124 depending therefrom. The comb 124 is provided with a plurality of teeth or serrations 125 forming spaces 126 (FIG. 4) therebetween.

Figure 4:
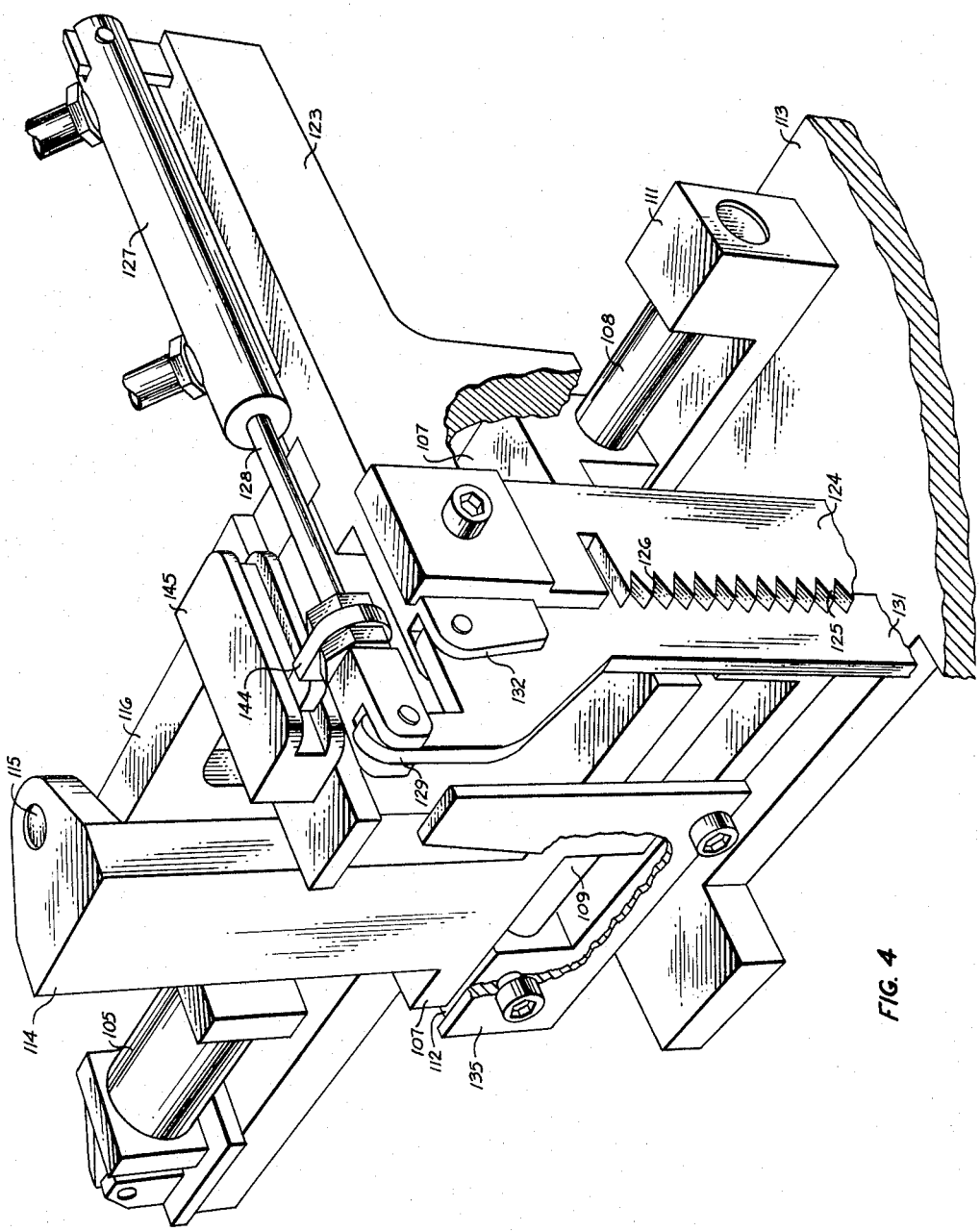
FIGS. 4 and 5 are perspective views made from two different viewpoints, showing various features of the lead-straightening device shown in FIG. 1.
Figure 5:
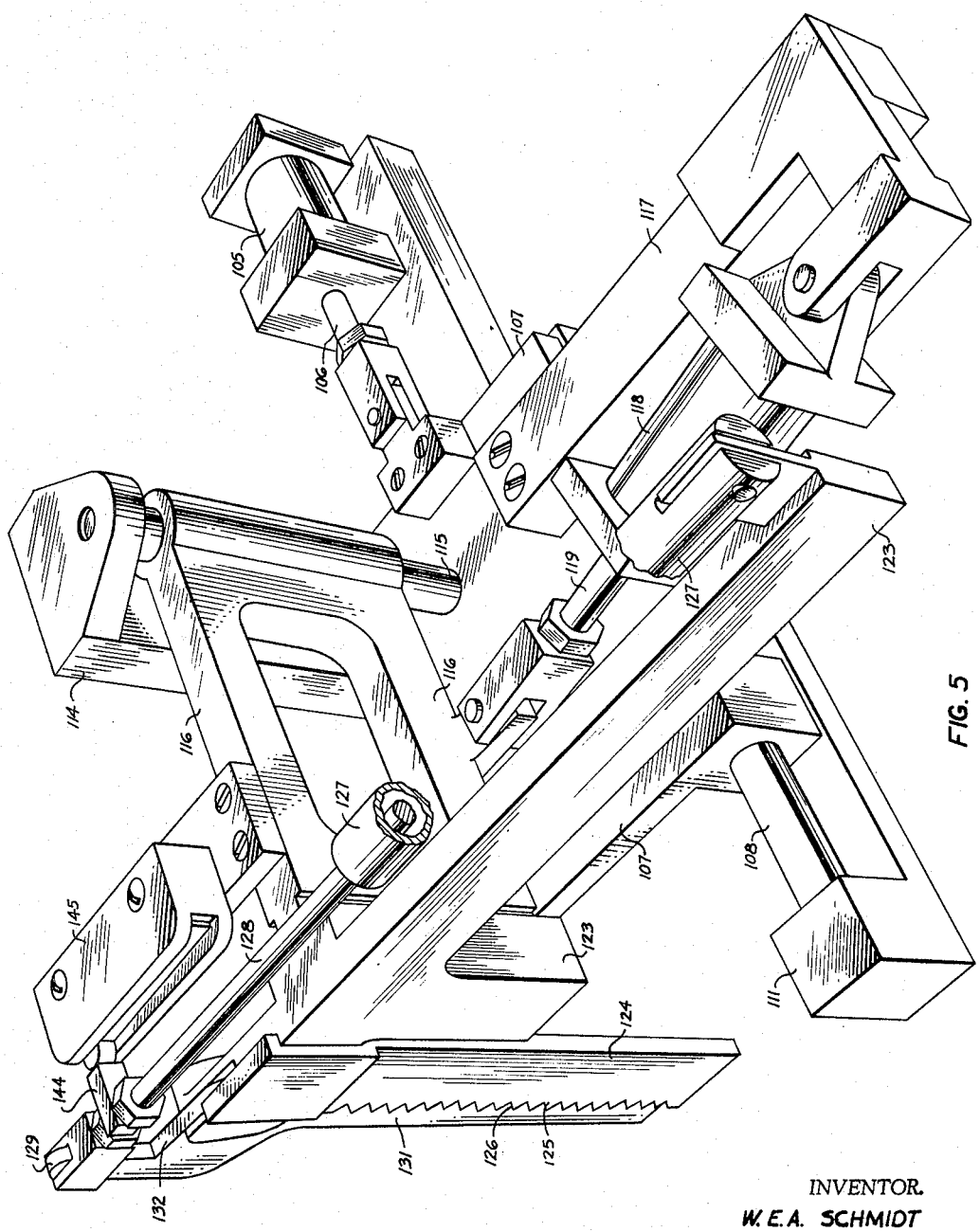

In addition, as shown in FIGS. 1, 4 and 5, an air cylinder 127 is positioned on the crossbar 123 and is provided with a piston rod 128 which is pivotally connected to one extremity 129 of a keeper 131. The keeper 131 is pivotally connected to the crossbar 123 at an intermediate point 132.

As the carriage 107 slides forward, the air cylinder 118 and piston rod 119 are operated to pivot the arm 116 and the comb 124 so that the spaces 126 will receive the resistor leads 28 of the previously loaded resistors 27. Further, as the arm 116 positions the comb 124, a switch 133 (FIG. 20) is actuated to energize a solenoid 134, thereby operating an air valve (not shown) to apply air to the air cylinder 127. Upon the actuation of the air cylinder 127, the piston rod 128 pivots the keeper 131 at the intermediate point 132 to position the keeper 131 adjacent to the comb 124 so that the resistor leads 28 are contained within the comb spaces 126.

As shown in FIGS. 4 and 6, a plate 135 is vertically and fixedly mounted on the block 112 adjacent to the support 114. A block 136 is mounted on the carriage 107 adjacent to the vertical plate 135 and is provided with a countersink aperture 137 for receiving a headed pin 138. A projection 139 is formed on the pin 138 and extends through a slot 141 formed in the block 136. As shown in FIG. 6, a compression spring 142 is fastened at one end to the projection 139 and is fastened at the opposite extremity to a pin 143 which projects from the block 136. As the cylinder 118 is actuated as previously described, the arm 116 will pivot and engage the headed pin 138 thereby urging the pin 138 slidably within the aperture 137 against the action of the spring 142 so that the projection 139 is urged within the slot 141. Therefore, during the period when the arm 116 is positioned so that the comb 124 engages the resistor leads 28, as previously described, the pin 138 will be maintained in position, as shown in FIG. 6.

When the keeper 131 is pivoted into position adjacent the comb 124, a cam 144, positioned on the piston rod 128, actuates a switch 145 (FIG. 20) to energize a solenoid 146 thereby controlling the air cylinder 105 to retract the carriage 107 along the rods 108 and 109. As the carriage 107 retracts, the projecting portion of the pin 138 engages the plate 135, as shown in FIG. 6, thereby limiting the rearward movement of the carriage 107. Thus, it is easily seen that as the carriage 107 is retracted, the resistor leads 28, which are contained within the spaces 126 of the comb 124 and held therein by the keeper 131, are thereby straightened.

*Styrofoam block insertion*

Referring to FIG. 2, a shaft 147, gear-connected to and driven by the motor 44, has a one-revolution clutch 148 mounted thereon which is controlled by a solenoid 149. In addition, the shaft 147 is provided with a gear 151 which is coupled to a gear 152 of a rotating disc 153. A pusher 154, which is slidably mounted on a rod 155, is positioned adjacent to and spaced from the gripping members 42. The rod 155 is mounted in a pair of blocks 156 and 157 which depend from the frame 31 wherein the frame 31 is provided with a slot 158 for movement of the pusher 154. The pusher 154 is mechanically connected to the rotating disc 153 by a connecting rod 159 whereupon a complete rotation of the disc 153 will provide a reciprocatory motion in the pusher 154. Additionally, a set of cams 161, 162 and 163 project from a corresponding set of bars 164, 165 and 166, which are mounted on the pusher 154 to provide actuation for a series of switches 167, 168 and 169 mounted on a panel 171, adjacent the pusher 154.

As viewed in FIG. 1, a tray 172 mounted adjacent the pusher 154 is provided for feeding singly a plurality of the Styrofoam blocks 29 into alignment with the pusher 154 to facilitate the insertion of the block 29 on the resistor leads 28. More specifically, the tray 172 is provided with a pusher 173 having rollers 174 and 175 mounted thereon wherein the rollers are contained within a pair of tracks 176 and 177, respectively. In addition, a nylon cord is attached to the pusher 173 and extends over a pulley (not shown) and is attached to a weight (not shown) for providing a force on the pusher 173 to move the blocks 29. A switch 178 (FIG. 20) is provided adjacent to the tray 172. In the event there is an absence of the Styrofoam blocks 29 adjacent the switch 178, the switch is actuated to provide power to a warning lamp 179 (FIG. 20).

As the carriage 107 is retracted, as previously described, the comb 124 trips a switch 181 (FIG. 20) thereby energizing the solenoid 149. Hence, the one-revolution clutch 148 is operated to allow a single revolution of the shaft 147 and, through the gears 151 and 152, a single revolution of the rotating disc 153. The rotating action of the disc 153 is coupled through the connecting rod 155 to the pusher 154 to provide the reciprocating motion in the pusher 154, as previously discussed. Hence, the previously fed Styrofoam block 29 is urged by the pusher 154 onto the resistor leads 28, thereby completing a packaged unit 26.

As shown in FIG. 2, the plurality of cams 161, 162 and 163 are attached to the pusher 154 to sequentially actuate the plurality of switches 167, 168 and 169, respectively. As the pusher 154 initiates the movement of the Styrofoam block 29, cam 161 actuates switch 167 (FIG. 20) to energize the solenoid 104, thereby operating the air cylinder 105 to slide the carriage 107 forward. Additionally, the cam 162 actuates the switch 168 (FIG. 20) to energize a solenoid 183, which controls the application of air to the air cylinder 127 to withdraw the piston rod 128 and pivotally retract the keeper 131 into the original open position. Further, the switch 169 (FIG. 20) is actuated by the cam 163 to energize a solenoid 184 to control the air cylinder 118, thereby pivotally retracting the arm 116 and hence removing the comb 124 from engagement with the resistor leads 28. As the arm 116 is retracted, a cam 185, mounted on the piston rod 119, actuates a switch 186 (FIG. 20) to control the solenoid 146, thereby operating the air cylinder 105 to retract the carriage 107.

It is noted that the comb 124 and the keeper 131 are retracted just prior to the completion of the urging of the Styrofoam block 29 upon the resistor leads 28. Therefore, the straightening operation, accomplished by the comb and keeper mechanism, does not interfere with the complete insertion of the Syrofoam block 29 upon the resistor leads 28. Additionally, as the carriage 107 moves forward in the previously discussed lead-straightening operation, a switch 187 (FIG. 19), which is in series with the solenoid 86 for controlling the rotation of the shaft 43 and the turret 41, is opened, thereby assuring no rotation of the turret 41 during the lead straightening and the Styrofoam block insertion operations. As the carriage 107 is retracted, the switch 187 is again actuated to insure the rotation of the turret 41 upon a given number of resistors 27 being loaded at the loading station 32, as previously mentioned.

Figure 7:
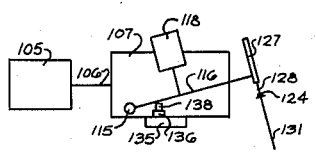
FIGS. 7 through 15 are diagrammatical views illustrating a sequence of operations of the lead-straightening devices.
Figure 8:
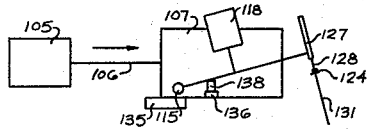
Figure 9:
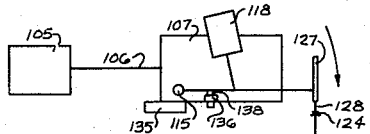
Figure 10:
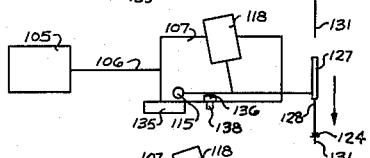

A series of diagrammatic views (FIGS. 7 through 15) show the sequential operation of the lead-straightening operation. In FIG. 7, the carriage 107 is shown in a non-operating positon. As the air cylinder 105 is operated (FIG. 8), the carriage 107 is moved to the right or in a forward position whereupon the air cylinder 118 is operated (FIG. 9) to pivotally position the arm 116 and the comb 124 in engagement with the resistor leads 28. In addition, the arm 116 engages the pin 138, thereby urging the pin through the block 136 and outwardly from the carriage 107. As the arm 116 is pivoted into position, the air cylinder 127 is operated to position the keeper 131 (FIG. 10) adjacent the comb 124, thereby retaining the resistor leads 28 within the comb spaces 126, as previously discussed.

Figure 11:
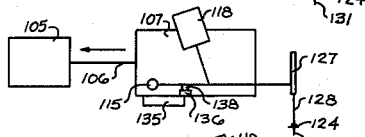
Figure 12:
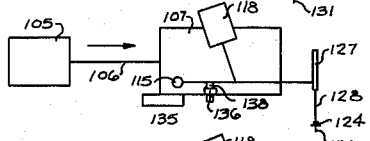
Figure 13:
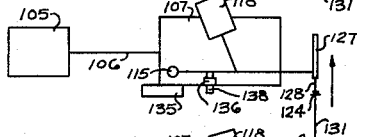
Figure 14:
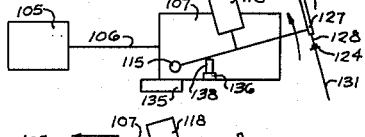
Figure 15:
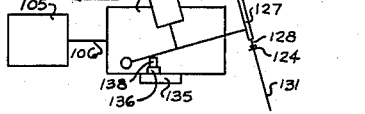

Upon the closing of the keeper 131, the switch 145 is actuated to operate the air cylinder 105, thereby retracting or moving the carriage 107 to the left until the pin 138 engages the fixed stop or plate 135 to limit the travel of the carriage 107 (FIG. 11). Hence, the lead-straightening operation is performed. The switch 167 (FIG. 20) is actuated by the movement of the pusher 154 to operate the cylinder 105 to move the carriage 107 forward (FIG. 12). In addition, movement of the pusher 154 actuates switch 168 to pivotally retract the keeper 131 (FIG. 13) and actuates the switch 169 to retract the arm 116 (FIG. 14) to a non-operating position, thereby disengaging the pin 138, whereupon the pin 138 is spring-biased to be retracted within the carriage 107. As the arm 116 is pivotally retracted, the switch 186 is actuated to control the air cylinder 105, thereby retracting the carriage 107 to the original non-operating position (FIG. 15).

Unloading

Upon completion of the lead straightening and Styrofoam inserting operations, the carriage 107 is retracted as previously described, to actuate the switch 187 whereupon the turret 41 will rotate as previously described. The packaged unit 26 (FIG. 16) is then positioned at an idle station wherein no operations are performed upon the unit 26. Hence, the unit 26 will rest at this station while a subseqeunt loading operation of another Styrofoam block is being performed in the manner previously discussed. Upon the completion of this subsequent loading operation, the turret 41 is again rotated ¼ revolution, thereby transferring the packaged unit 26 to the unloading station 35. A cam 188 (FIG. 1), fixedly mounted about the axis of the turret 41, is provided with a lobe 189 that engages the ends of the arms 75 to pivot the gripping arms 66 and 67 into open position, thereby releasing the packaged unit 26 (FIG. 1).

The shaft 43 is provided with a cam 191 for actuating a switch 192 (FIGS. 2 and 20). As the shaft 43 rotates, the switch 192 is actuated to control a timer 193 including a coil 194 and contact 195 (FIG. 20) to control a solenoid 196. The solenoid 196 is energized for a given period of time, dependent upon the action of the timer 193, to control an air valve 197 (FIG. 20) which provides an air pressure through an air line 198 to a nozzle 199 (FIGS. 1 and 2) for aiding the orientation of the packaged unit 26, as it is released from the gripping arms 66 and 67, as previously mentioned. It is to be noted that the air line 198 and the nozzle 199 are fastened to a support 201 which is mounted on the frame 31. Hence, upon the release of the packaged unit 26 by the gripping arms 66 and 67 and the air assist from the nozzle 199, the packaged unit 26 will fall by gravitational forces in a channel 202 formed by vertical walls 203 and then upon a conveyor 204 (FIGS. 1 and 17) which is being driven by the motor 44 and supported by the frame 31.

The packaged unit 26 is then conveyed from the unloading station 35 by the conveyor 204 to an unloading platform 205 (FIGS. 1 and 17). As the packaged unit 26 enters the unloading platform 205, a switch 206 (FIG. 20) is actuated to operate a solenoid 207, thereby controlling an air cylinder 208 (FIGS. 1, 17 and 18) which is positioned adjacent to an unloading tray 209. Upon operation of the air cylinder 208, a pusher 211 engages the discharged packaged unit 26 and forces the unit into the unloading tray 209 (FIGS. 1 and 18). Each succeeding unit 26, then delivered singly to the tray 209, is pushed into the tray and into engagement with the previously delivered units 26 to urge the units further into the tray 209. As the tray 209 nears filling, a switch 212 is actuated to provide energy for the lamp 179 (FIG. 20) to notify the operator of the impending loaded tray 209. Upon the completion of the loading of the tray 209, and the operator having been prewarned, the tray 209 containing the packaged units 26 is removed, thereby providing space for an empty tray 209 for the reception of additional packaged units 26.

End of cycle clearance

In the event it is desired to cease the packaging operations, or to change to another product value, it is desirable to clear the packaging machine of all resistors 27 which have not been assembled within a packaged unit 26 by operating the machine through a complete cycle. Therefore, a magnetic slug (not shown), is inserted in the V-groove 45 of the pallet 46 which follows the last resistor 27 to be packaged. As the magnetic slug passes the sensing station 37 (FIG. 1), a slug detector 213 senses the presence of the magnetic slug to close a pair of contacts 214 (FIG. 19), thereby energizing a coil 215 of a relay 216. A contact of the relay 216 is closed to provide energy for a solenoid 218 (FIG. 20) which in turn controls an air valve (not shown) to pneumatically position a pair of stop pins 219 and 221 along the conveyor 48 and in the path of the pallet 46 carrying the magnetic slug. In addition, a solenoid 222 is energized to control an air valve (not shown) to provide an air blast from a nozzle 223 (FIG. 1) thereby forcing the magnetic slug from the pallet 46 and into a chute 224 to remove the slug from the machine.

A second contact 225 of the relay 216 is actuated to energize a motor 226 of a timer 227 which programs a cycling operation of the machine in accordance with previously determined operations. As observed in FIG. 19, the timer 227 is provided with a series of contacts where, upon the actuation of the timer 227, a contact 228 is actuated to retain the timer 227 in operation during the entire cycling of the machine. A second contact 229 is actuated by the timer 227 to reset the slug detector 213, thereby opening contacts 214 and deenergizing the coil 215 of relay 216. Additionally, the timer 227 controls a series of contacts 231, 232 and 233, to periodically and sequentially actuate the relay 84, thereby energizing the solenoid 86 to sequentially release the one-revolution clutch 87 and rotate the turret though a corresponding series of quarter revolutions. A contact 234 is also controlled by the timer 227 to energize a solenoid 235 to operate an air valve (not shown) thereby removing the stop pins 219 and 221 to permit the continued movement of the pallet 46 on the conveyor 48.

Hence, it is easily seen that in the event any resistors 27 remained in pallets 46 on the conveyor 48, the resistors 27 would normally be loaded, as previously described, and processed through the cycle of lead straightening and Styrofoam block insertion as is provided by the timer 227 in the periodical rotation of the turret 41. It is to be noted that a switch 236 is positioned such that an operator may manually actuate the switch 236 to operate the timer 227 in the sequence, previously described. However, in the event a pallet 46 should be over the stop pins 219 and 221 at the instant the operator closes the switch 236, a switch 237, which is connected in series with the switch 236, is opened, thereby preventing the injection of the stop pins 219 and 221, and the upsetting of the pallet 46. Additionally, the timer 227 would not be actuated due to the action of the switch 237.

Additional control circuits

With particular reference to FIG. 20, there is shown a pressure switch 238 which is physically located in a vacuum supply line (not shown) for the vertical lift rod 62. Due to the absence of the resistor 27, an air pressure would develop within the vacuum line of the vertical lift rod 62, thereby actuating the switch 238. The actuation of the switch 238 provides sufficient potential to a coil 239 of a relay 241 to close a contact 242 wherein a relay 243 energizes and opens a normally closed contact 244 in series with the solenoid 104 which controls the forward movement of the carriage 107. In this manner, actuation of the lead straightening and Styrofoam pusher operations is prevented in the absence of resistors 27 on the pallets 46.

It is to be understood that the above-described arrangements are illustrative of the principles of the invention. Numerous other arrangements may be devised by those skilled in the art without departing from the spirit and scope of the invention.

What is claimed is:

1. A method of forcing a penetrable block onto a plurality of leads extending from a group of components which comprises:

holding the components with the leads extending in a common direction, straightening the leads by moving a comb along the leads, and advancing the penetrable block onto the straightened leads while moving the comb back along the leads to guide the leads into the advancing penetrable block.

2. A method of packaging a plurality of electrical components having leads extending therefrom, which comprises the steps of positioning the components in a juxtaposed group with the leads extending towards a block of penetrable material, moving a comb along the leads toward the block of penetrable material to straighten the extended leads, relatively moving the block of penetrable material and electrical components toward each other while supporting the leads with the comb, and piercing the block with the straightened leads to substantially embed the leads in the block to form a unit therewith.

3. A method of packaging a plurality of electrical components having leads extending therefrom, which comprises the steps of successively removing individual components from a supply, individually positioning the components in a juxtaposed group, positioning a block of penetrable material adjacent to the leads extending from the juxtaposed components, positioning the extended leads within an enclosure, moving the enclosure relative to the extended leads to straighten the leads, relatively moving the block and the components toward each other while supporting the leads with the enclosure, piercing the block with the leads to substantially embed the leads within the block to form a unit therewith, and then removing the enclosure from about the leads as the leads are embedded in the block.

4. Apparatus for packaging articles having leads extending therefrom, which comprises:

means for straightening the extended leads, means for positioning the articles in juxtaposition to the lead-straightening means and a block of penetrable material, means for moving the lead-straightening means along the leads to straighten each lead, and means for moving the penetrable block into embedding engagement with the straightened leads while advancing the lead-straightening means along the leads.

5. Apparatus for packaging articles having leads extending therefrom, which comprises:

means for positioning the articles in a juxtaposed group, means for positioning a block of penetrable material adjacent to the extended leads of the juxtaposed articles.

a lead-straightening device including means for substantially enclosing the extended leads of the articles positioned adjacent to the articles, means for relatively moving the lead-straightening device and the articles toward each other, means for positioning the enclosing means about the extended leads, means for moving the enclosing means away from the article so that the leads are straightened thereby, and means for relatively moving the block and the articles so that the leads pierce and are embedded in the block to form a packaged unit therewith.

6. In an apparatus for forcing a penetrable block onto a plurality of leads extending from a group of components, a holder for positioning the group of components in alignment with the leads extending in a common direction, a carriage mounted for movement toward and away from said holder, a comb movably mounted on said carriage and having teeth to fit within the spaces separating the leads, means for moving the carriage toward and away from the holder, means rendered effective by the carriage moving toward the holder for moving the comb to advance the teeth between the leads whereupon the movement of the carriage away from the holder effectuates a straightening of the lead by the movement of the comb teeth along the leads, a pusher means actuated by the movement of the carriage away from the holder for advancing a penetrable block toward the holder and onto the straightened leads, and means actuated by the pusher means for again moving the carriage toward the holder to move the comb teeth along the leads while the pusher forces the block onto the leads.

7. Apparatus for packaging articles having leads extending therefrom, which comprises:

means for positioning the articles in a juxtaposed group adjacent to a block of penetrable material, a slide positioned adjacent to the article, a comb pivotally mounted on the slide, a keeper pivotally mounted on the comb, means for relatively moving the slide and the articles toward each other, means responsive to the movement of the slide for pivoting the comb into engagement with the extended leads so that the leads are received in spaces between the teeth of the comb, means responsive to the pivotal movement of the comb for pivoting the keeper to a position adjacent to the teeth of the comb and into engagement with the extended leads so that the leads are substantially held within the spaces between the teeth of the comb, means responsive to the movement of the keeper for relatively moving the slide and the articles away from each other so that the comb and the keeper move about the enclosed leads thereby straightening the leads, and means responsive to movement of the slide for sequentially removing the keeper and the comb from the leads and for moving the block into piercing engagement with the extended leads so the leads are embedded in the block to form a packaged unit therewith.

8. An apparatus for packaging articles with leads extending therefrom, which comprises:

means for positioning the articles in a juxtaposed group so that the leads extend toward a block of penetrable material, a movable support positioned adjacent to the articles, means mounted on the support for engaging and enclosing the extended leads of the articles, means for relatively moving the movable support and the articles toward each other, means responsive to the movement of the support for positioning the enclosing means about the extended leads, means responsive to the movement of the enclosing means for relatively moving the support and the articles away from each other so that the enclosing means moves axially along and straightens the extended leads, and means for sequentially removing the enclosing means and for relatively moving the block and the articles toward each other so that the leads piercingly engage and are embedded in the block to form a packaged unit therewith.

9. A device for straightening a plurality of leads extending from a plurality of juxtaposed articles, which comprises:

a movable support, a comb pivotally mounted on a support, a keeper mounted for pivotal movement about one end of the comb adjacent to a plurality of teeth formed in the comb, means for moving the movable support toward the juxtaposed articles, means responsive to the movement of the support for pivoting the comb into engagement with the extended leads so that the leads are received between the teeth of the comb, means responsive to the movement of the comb for pivotally positioning the keeper adjacent to the teeth and in engagement with the extended leads so that the leads are enclosed in the spaces between the teeth and the keeper, and means responsive to the movement of the keeper for moving the support away from the articles to the enclosed leads.

References Cited by the Examiner

UNITED STATES PATENTS

| | | | |
|---|---|---|---|
| 2,337,055 | 12/1943 | Mathias et al. | 140—147 X |
| 3,007,291 | 11/1961 | Jordan et al. | 53—200 X |
| 3,013,590 | 12/1961 | Pechy | 140—147 |
| 3,075,562 | 1/1963 | Jankowski | 140—147 |
| 3,106,945 | 10/1963 | Wright et al. | 140—147 |

TRAVIS S. McGEHEE, *Primary Examiner.*

GRANVILLE Y. CUSTER, Jr., *Examiner.*